US011037452B2

(12) United States Patent
Hampel et al.

(10) Patent No.: US 11,037,452 B2
(45) Date of Patent: Jun. 15, 2021

(54) METHOD AND SYSTEM FOR OBTAINING AND PRESENTING TURBULENCE DATA VIA COMMUNICATION DEVICES LOCATED ON AIRPLANES

(71) Applicant: Yamasee Ltd., Bet Uziel (IL)

(72) Inventors: Oran Hampel, Aseret (IL); Zivi Nedivi, Tel Aviv (IL); Moshe Shitrit, Ra'anana (IL)

(73) Assignee: YAMASEE LTD., Bet Uziel (IL)

( * ) Notice: Subject to any disclaimer, the term of this patent is extended or adjusted under 35 U.S.C. 154(b) by 14 days.

(21) Appl. No.: 16/692,277

(22) Filed: Nov. 22, 2019

(65) Prior Publication Data

US 2020/0090528 A1 Mar. 19, 2020

Related U.S. Application Data

(63) Continuation of application No. 16/245,540, filed on Jan. 11, 2019, now Pat. No. 10,580,312, which is a
(Continued)

(51) Int. Cl.
*G08G 5/00* (2006.01)
*G01W 1/10* (2006.01)
(Continued)

(52) U.S. Cl.
CPC .......... *G08G 5/0091* (2013.01); *B64D 43/00* (2013.01); *G01W 1/10* (2013.01); *G06F 16/909* (2019.01);
(Continued)

(58) Field of Classification Search
CPC .. G08G 5/0091; G08G 5/0021; G08G 5/0008; G08G 5/0013; B64D 43/00;
(Continued)

(56) References Cited

U.S. PATENT DOCUMENTS 6,285,878 B1 9/2001 Lai
6,590,520 B1 7/2003 Steele et al.
(Continued)

FOREIGN PATENT DOCUMENTS

EP 2693417 2/2014
EP 2378318 2/2017
(Continued)

OTHER PUBLICATIONS

Office action for U.S. Appl. No. 14/615,034 dated Apr. 27, 2015.
(Continued)

*Primary Examiner* — Dale W Hilgendorf
(74) *Attorney, Agent, or Firm* — Pearl Cohen Zedek Latzer Baratz LLP

(57) ABSTRACT

A device, system and method is provided for obtaining and processing turbulence data via communication devices located on-board airplanes. Turbulence data obtained by a plurality of communication devices may be received during flights on-board respective ones of a plurality of airplanes. Turbulence map data may be generated by super-positioning the turbulence data received from the plurality of communication devices onto a single tempo-spatial frame of reference. The turbulence map data may be distributed to one or more of the communication devices. A device, system and method is also provided for generating turbulence map data that may reduce or eliminate "false positive" turbulence events. A device, system and method is also provided for communicating with on-board communication devices operating in a "flight crew mode" or a "passenger mode."

30 Claims, 10 Drawing Sheets

Related U.S. Application Data continuation of application No. PCT/IL2017/050776, filed on Jul. 10, 2017, said application No. 16/245,540 is a continuation-in-part of application No. 15/547,770, filed as application No. PCT/IL2016/050070 on Jan. 21, 2016, now Pat. No. 10,720,063, application No. 16/692,277, filed on Nov. 22, 2019, which is a continuation-in-part of application No. 15/547,770, filed as application No. PCT/IL2016/050070 on Jan. 21, 2016, now Pat. No. 10,720,063.

(60) Provisional application No. 62/360,818, filed on Jul. 11, 2016, provisional application No. 62/196,431, filed on Jul. 24, 2015.

(51) Int. Cl.
*G06F 16/909* (2019.01)
*B64D 43/00* (2006.01)
*G01W 1/00* (2006.01)
*H04W 4/02* (2018.01)

(52) U.S. Cl.
CPC ......... *G08G 5/0008* (2013.01); *G08G 5/0013* (2013.01); *G08G 5/0021* (2013.01); *G01W 2001/003* (2013.01); *G01W 2001/006* (2013.01); *H04W 4/027* (2013.01)

(58) Field of Classification Search
CPC ............. G01W 1/10; G01W 2001/006; G01W 2001/003; G06F 16/909; H04W 4/027
See application file for complete search history.

(56) References Cited

U.S. PATENT DOCUMENTS

| | | |
|---|---|---|
| 6,650,972 B1 | 11/2003 | Robinson et al. |
| 6,810,527 B1 | 10/2004 | Conrad et al. |
| 6,813,493 B2 | 11/2004 | Criqui et al. |
| 6,889,042 B2 | 5/2005 | Rousseau et al. |
| 7,027,898 B1 | 4/2006 | Leger et al. |
| 7,400,293 B2 | 7/2008 | Fleming |
| 7,489,992 B2 | 2/2009 | Valette et al. |
| 7,612,688 B1 | 11/2009 | Vigeant-Langlois et al. |
| 7,917,255 B1 | 3/2011 | Finley |
| 8,094,605 B2 | 1/2012 | Lynch et al. |
| 8,130,121 B2* | 3/2012 | Smith ................ G08G 5/0021 340/945 |
| 8,131,407 B1 | 3/2012 | Robinson |
| 8,131,408 B2 | 3/2012 | Kordt |
| 8,159,369 B1 | 4/2012 | Koenigs et al. |
| 8,209,071 B2 | 6/2012 | Ross |
| 8,629,788 B1 | 1/2014 | Greenleaf et al. |
| 8,907,817 B1 | 12/2014 | Finley et al. |
| 9,126,696 B1 | 9/2015 | Hampel et al. |
| 9,325,793 B1 | 4/2016 | Stone et al. |
| 9,738,400 B2 | 8/2017 | Dugan |
| 9,881,507 B2 | 1/2018 | Rencher et al. |
| 2003/0179727 A1 | 9/2003 | Soong et al. |
| 2006/0040612 A1 | 2/2006 | Min |
| 2006/0121893 A1 | 6/2006 | Tillotson et al. |
| 2006/0238384 A1 | 10/2006 | Hess et al. |
| 2007/0162197 A1 | 7/2007 | Fleming |
| 2008/0154446 A1 | 6/2008 | Rui et al. |
| 2009/0286550 A1 | 11/2009 | Weinroth |
| 2010/0145765 A1* | 6/2010 | Kantarek ............. G06Q 30/02 705/7.32 |
| 2011/0257818 A1* | 10/2011 | Ganz ................... G08G 5/0013 701/14 |
| 2012/0010806 A1 | 1/2012 | Tseng |
| 2013/0126679 A1 | 5/2013 | Estkowski et al. |
| 2013/0158751 A1 | 6/2013 | Cornell et al. |
| 2013/0166113 A1 | 6/2013 | Dakin et al. |
| 2013/0226452 A1* | 8/2013 | Watts ................. G01C 21/3407 701/528 |
| 2014/0074326 A1 | 3/2014 | Pereira |
| 2014/0201191 A1 | 7/2014 | Karmarkar |
| 2016/0133137 A1* | 5/2016 | Rencher ............... G08G 5/0013 701/537 |
| 2018/0068332 A1* | 3/2018 | Kajak ................ G06Q 30/0203 |

FOREIGN PATENT DOCUMENTS

| | | |
|---|---|---|
| RU | 2200963 | 2/2003 |
| RU | 2407181 | 12/2010 |
| RU | 2421922 | 6/2011 |
| RU | 2469411 | 12/2012 |
| RU | 2669780 | 10/2018 |

OTHER PUBLICATIONS

Notice of Allowance for U.S. Appl. No. 14/615,034 dated Jun. 24, 2015.
"WSI Total Turbulence" archived from http://www.wsi.com/products-aviation-commercial-wsi-totalturbulence.htm on Feb. 2, 2015.
"WSI Total Turbulence Overview" Oct. 2014.
Russian Search Report with English translation from corresponding application RU 2019103375; dated Oct. 5, 2020.
Decision of Grant with English translation from corresponding application RU 2019103375; dated Jan. 27, 2021.

\* cited by examiner

_300A_

- 310A — RECEIVING TURBULENCE DATA OBTAINED BY A PLURALITY OF COMMUNICATION DEVICES DURING FLIGHTS ON-BOARD RESPECTIVE ONES OF A PLURALITY OF AIRPLANES

- 320A — GENERATING ACCUMULATED TEMPO-SPATIAL TURBULENCE INFORMATION BY SUPER-POSITIONING THE TURBULENCE DATA RECEIVED FROM THE PLURALITY OF COMMUNICATION DEVICES ONTO A SINGLE TEMPO-SPATIAL FRAME OF REFERENCE

- 330A — DISTRIBUTING THE ACCUMULATED TEMPO-SPATIAL TURBULENCE INFORMATION TO ONE OR MORE OF THE COMMUNICATION DEVICES

Figure 3A

METHOD AND SYSTEM FOR OBTAINING AND PRESENTING TURBULENCE DATA VIA COMMUNICATION DEVICES LOCATED ON AIRPLANES

CROSS REFERENCE TO RELATED APPLICATIONS

This application is a continuation application of U.S. patent application Ser. No. 16/245,540 filed Jan. 11, 2019, which is a continuation application of PCT International Application No. PCT/IL2017/050776 International Filing Date Jul. 10, 2017 published on Jan. 18, 2018 as International Patent No. WO 2018/011791, which claims the benefit of U.S. Provisional Patent Application No. 62/360,818 filed Jul. 11, 2016, where U.S. patent application Ser. No. 16/245,540 filed Jan. 11, 2019 is also a continuation-in-part of U.S. Patent Application No. 15/547,770 filed Jul. 31, 2017, which is a National Phase Application of PCT International Application No. PCT/IL2016/050070 International Filing Date Jan. 21, 2016 published on Aug. 11, 2016 as International Patent Publication No. WO 2016/125139, which claims the benefit of U.S. Provisional Patent Application No. 62/196,431, filed Jul. 24, 2015 and is a continuation-in-part of U.S. patent application Ser. No. 14/615,034 filed Feb. 5, 2015 issued as a U.S. Pat. No. 9,126,696 on Sep. 8, 2015, all of which are incorporated herein by reference in their entireties.

This application is also a continuation-in-part application of U.S. patent application Ser. No. 15/547,770 filed Jul. 31, 2017, which is a National Phase Application of PCT International Application No. PCT/IL2016/050070 International Filing Date Jan. 21, 2016 published on Aug. 11, 2016 as International Patent Publication No. WO 2016/125139, which claims the benefit of U.S. Provisional Patent Application No. 62/196,431, filed Jul. 24, 2015 and is a continuation-in-part of U.S. patent application Ser. No. 14/615,034 filed Feb. 5, 2015 issued as a U.S. Pat. No. 9,126,696 on Sep. 8, 2015, all of which are incorporated herein by reference in their entireties.

FIELD OF THE INVENTION

Embodiments of the present invention relate generally to the field of crowdsourcing, and more particularly to obtaining turbulence data along flight routes via communication devices.

BACKGROUND OF THE INVENTION

Prior to setting forth the background of the invention, it may be helpful to set forth definitions of certain terms that will be used hereinafter.

The term "turbulence" as used herein refers to a rapid variation of pressure and flow velocity in space and time that affect airplanes during flights. Turbulence affects the comfort of the passengers of the flight and may also affect the safety of the flight. Additionally, turbulence may affect the fuel consumption of the airplane. Clear-air turbulence (CAT) is the turbulent movement of air masses in the absence of any visual cues such as clouds, and is caused when bodies of air moving at widely different speeds meet. Therefore, CAT events are significantly more difficult to detect.

The term "communication device" as used herein refers to any electronic device that is provided with the ability to both transmit and receive data, usually but not exclusively, over a communication network. Communication devices may include user equipment (UE) such as hand-held mobile devices that are not integral to and may be carried onto and off of an airplane including, for example, smartphones, tablet personal computers (PCs), and laptop PCs. User equipment (UE) may be operated for example by a pilot, flight crew member or a passenger, for example, releasable secured to a dashboard mount in the cockpit so that the user equipment has a generally fixed position relative to the airplane. Additionally or alternatively, communication devices may be part of embedded airplane communication systems that are embedded in, inseparably mounted to, or integral to, airplane devices. Embedded airplane communication devices may include, for example, transmitter-responders (transponders), such as mode C transponders or mode S transponders, or Universal Access Transceivers (UATs). Communication devices may include or may be operatively connected to one or more turbulence sensor(s), communication circuit(s) including antenna(e), memor(ies), processor(s), and display(s), any combination of which may be integrated into one housing as a single device, or may be separated into different devices. Data may be transmitted between the user equipment, embedded airplane communication devices, satellites, ground communication devices, or any combination thereof over one or more wireless networks including, for example, radio, satellite, Wi-Fi (e.g. IEEE 802.11 family), cellular such as 3G or long term evolution (LTE), or any combination thereof.

FIG. 1 is a map diagram illustrating turbulence data obtained by forecast models. Map 10 shows areas that are likely to be affected by turbulence. The darker pattern indicates a likelihood of a relatively severe level of turbulence, whereas the lighter pattern indicates a likelihood of a relatively moderate level of turbulence. The data derived from the forecast models may be regularly updated and is typically based on mathematical models. The data may be generated for different timeslots and altitude ranges so that a flight route may be planned and amended accordingly.

These maps are generated via forecast models generally based on weather conditions, but suffer from severe inaccuracies due to the inability to correctly estimate the effect of the various weather conditions on turbulence. First, not all clouds lead to turbulence, and second, various conditions such as clear-air turbulence (CAT) cannot be accurately forecasted. Therefore, currently available solutions for obtaining and presenting turbulence data tend to suffer both from 'no detection' scenarios and 'false alarm' scenarios which generally undermine the reliability of turbulence monitoring.

SUMMARY OF EMBODIMENTS OF THE INVENTION

Embodiments of the present invention provide a device, system and method for obtaining and processing turbulence data via communication devices located on-board airplanes. Turbulence data may be received including multiple different turbulence levels within each of one or more regions of a turbulence map obtained by a plurality of communication devices during flights on-board respective ones of a plurality of airplanes. The received turbulence data may be obtained for example by obtaining spatial acceleration data affecting each of the plurality of communication devices and converting the spatial acceleration data into turbulence data based on a conversion process. Turbulence map data may be generated including accumulated tempo-spatial turbulence information of a single turbulence level for each of the one or more regions by super-positioning onto a single tempo-spatial frame of reference the turbulence data including the multiple different turbulence levels within each of the one or more regions received from the plurality of communication devices. The turbulence map data including the accumulated tempo-spatial turbulence information may be distributed to one or more of the plurality of communication devices. The distributed turbulence map data may be displayed, e.g., as a turbulence map visualization, on a display of one or more of the plurality of communication devices.

Embodiments of the present invention provide a device, system and method for obtaining turbulence data by a communication device during a flight on-board an airplane. The turbulence data from the communication devices may be transmitted to a remote location. Accumulated tempo-spatial turbulence information may be received that is generated at the remote location by super-positioning the turbulence data received from the communication device with turbulence data received from one or more other communication devices during flights on-board other airplanes onto a single tempo-spatial frame of reference. The accumulated tempo-spatial turbulence information associated with regions surrounding the airplane of the communication device and the other airplanes may be displayed.

The system may use a distribution server connected to the plurality of communication devices over a common communication network. The communication devices thus serve both as sources of the turbulence data and also as the recipients of the accumulated turbulence data. The plurality of communication devices may include one or more hand-held user communication devices, e.g., operated by a pilot (in "pilot" or "flight crew" mode) or a passenger (in "passenger" mode), embedded airplane communication devices, e.g., integrated or embedded inside the airplane, and/or supplemental communication devices to supplement the aforementioned primary hand-held or embedded communication devices, e.g., when the reception or accuracy of turbulence or positioning information thereof is degraded, such as, information detected by a navigation system, e.g., Global Navigation Satellite System (GNSS) or global positioning system (GPS).

A device, system and method is provided for generating turbulence map data. Some embodiments of the invention may be used, for example, to generate turbulence map data with fewer or no "false positive" turbulence events.

In accordance with an embodiment of the invention, a plurality of turbulence values may be received that are obtained by one or more airplanes while travelling through a single airspace region within a predetermined period of time. At least two of the turbulence values may be different. Turbulence map data may be generated for the airspace region based on a minimum of the different turbulence values. The turbulence map data of at least the airspace region may be transmitted based on the minimum turbulence values to one or more communication devices.

In accordance with an embodiment of the invention, a turbulence value may be received that is obtained by a first communication device during a flight on-board a first airplane while traveling through an airspace region. Embodiments of the invention may set a predetermined lock-out period of time after the turbulence value is obtained during which the turbulence value may only be decreased, but not increased. During the predetermined lock-out period of time, the turbulence value may be adjusted based on a subsequently received turbulence value obtained by the same or different communication device during a flight on-board the same or different airplane while traveling through the same airspace region if (e.g., and only if) the subsequent turbulence value is less than the turbulence value obtained by the first communication device. Turbulence map data may be transmitted including the turbulence value set for the airspace region to one or more communication devices.

In accordance with an embodiment of the invention, turbulence values may be received that are obtained by a plurality of communication devices during flights on-board the same or different airplanes travelling through a single airspace region within a predetermined period of time. After receiving a first one of the turbulence values, if a subsequently received one of the turbulence values is lower than the first turbulence value, the turbulence value for the airspace region may be set or lowered based on the subsequently received turbulence value, whereas if the first turbulence value is greater than the subsequently received turbulence value, the turbulence value for the airspace region may remain or be set based on the first turbulence value. Turbulence map data of the airspace region may be transmitted to one or more communication devices based on the turbulence value set for the airspace region.

In accordance with an embodiment of the invention, a device, system and method is provided for communicating with communication devices operating in a flight crew mode or a passenger mode during flights on-board airplanes. Flight crew turbulence data may be received at a centralized control device from a plurality of communication devices operated by flight crew members in flight crew mode during flights on-board respective ones of a plurality of airplanes. The communication devices operating in flight crew mode may have flight crew security privileges that self-authenticate the integrity of the flight crew turbulence data. Passenger turbulence data may be received at the centralized control device from a plurality of communication devices operated by passengers in passenger mode during flights on-board respective ones of a plurality of airplanes. The communication devices operating in the passenger mode may have passenger security privileges that do not self-authenticate, but require the centralized control device to authenticate, the integrity of the passenger turbulence data. Turbulence map data including accumulated tempo-spatial turbulence information may be generated at the centralized control device by super-positioning onto a single tempo-spatial frame of reference the received flight crew turbulence data self-authenticated by the flight crew security privileges and the passenger turbulence data authenticated by the centralized control device. The turbulence map data may be distributed to one or more of the plurality of communication devices for displaying the distributed turbulence map data while operating in the flight crew mode or in the passenger mode.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A is a flowchart diagram illustrating a method for monitoring turbulence data in accordance with embodiments of the present invention;

Figure 1:
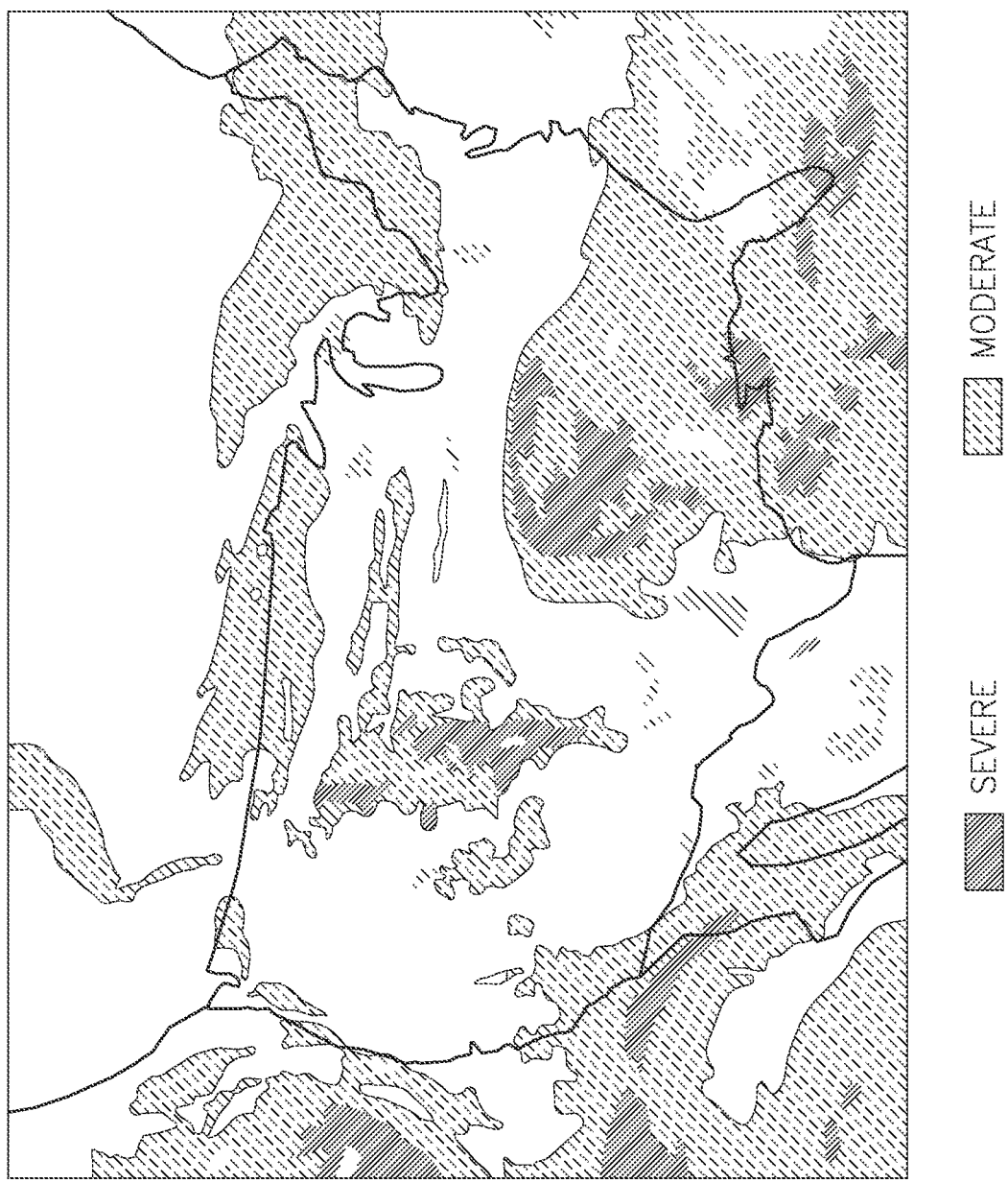
FIG. 1 is a map diagram illustrating turbulence data obtained by forecast models.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2:
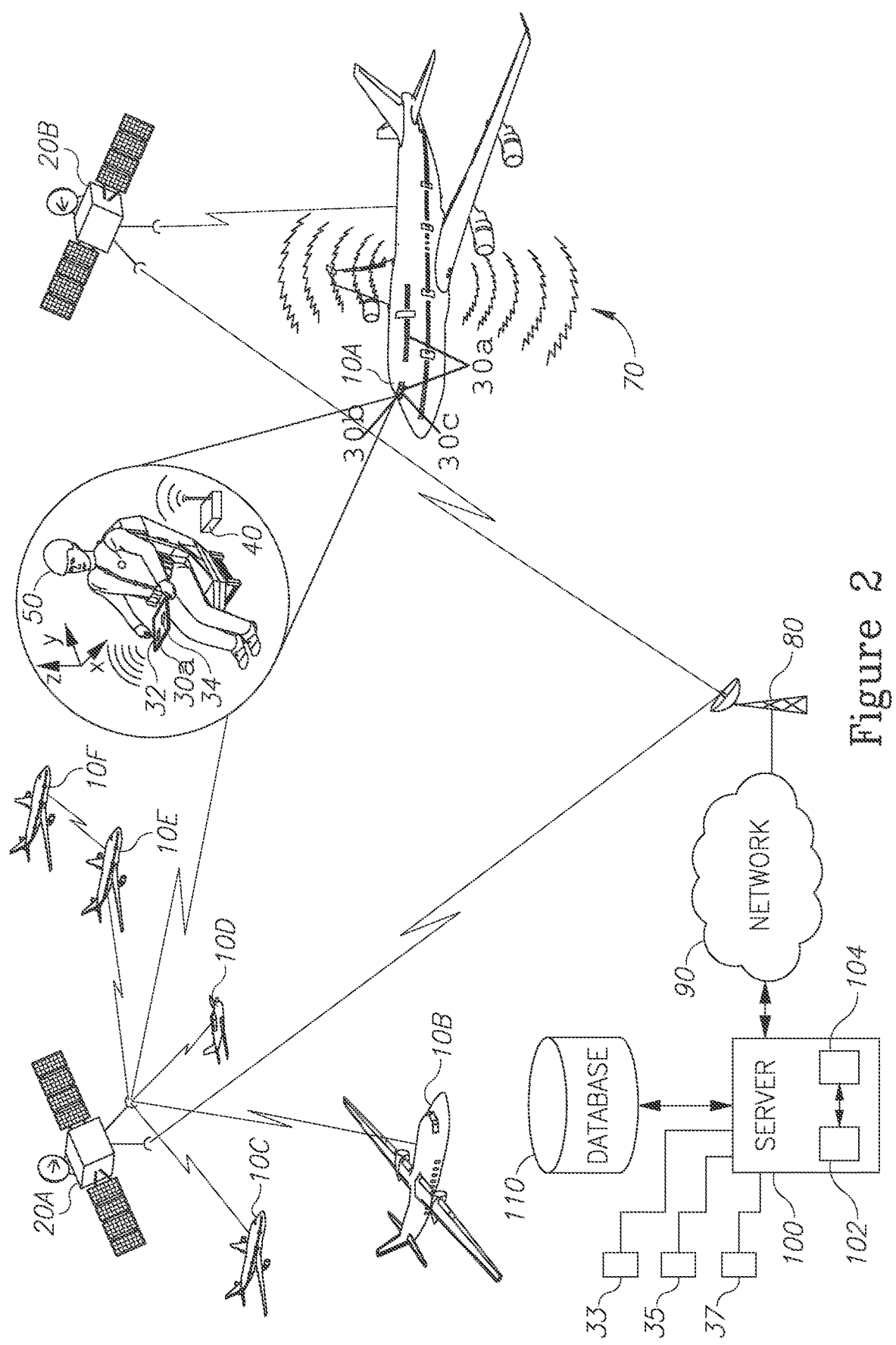
FIG. 2 is a schematic illustration of a system for monitoring turbulence data in accordance with embodiments of the present invention.

FIG. 2 is a schematic illustration of a system for monitoring turbulence data in accordance with embodiments of the present invention. The system may include a plurality of communication devices 30 (e.g., one or more devices 30a, 30b, and/or 30c) located respectively on a plurality of airplanes 10A-10F and configured to obtain and transmit turbulence data relating to turbulence 70 affecting the respective airplanes 10A-10F over a communication channel Communication devices 30 may include or be operatively connected to a sensor or detector such as an accelerometer for collecting and recording turbulence data, a communication circuit having an antenna for communicating with other devices, one or more memories 32 for storing turbulence data and processing instructions, one or more processors 34 for executing the instructions, and/or a display for displaying turbulence data or maps.

Communication devices 30 may include navigation or positioning systems, such as, Global Navigation Satellite System (GNSS), global positioning system (GPS), GLONASS, Galileo, and/or Beidou, to determine location or position information. Communication devices 30 may be carried on board an airplane by users, may be mounted on the airplane, or may form an integral part of the airplane in embedded communication systems on board the aircraft. Communication devices 30a may include, for example, a hand-held mobile device or user equipment, such as a tablet PC held by a user 50 (e.g., a pilot holding or mounting the device on a dashboard). Communication devices 30b may additionally or alternatively be part of an embedded aircraft communication system in one or more of airplanes 10A-10F. Embedded aircraft communication systems may include multiple components (e.g., a transponder such as a mode C transponder or a mode S transponder, Universal Access Transceiver (UAT), memory, processor, display, weather radar, and the like) that may be packed into one housing or embedded in several different locations in the interior or exterior of the airplane. Embedded communication devices 30b may provide information from internal sensors, e.g., altimeter, clock, location module. Communication devices 30c may additionally or alternatively include one or more supplemental devices used, in addition to the above hand-held communication devices 30a or embedded communication devices 30b, to supplement or replace the data collected therefrom. In some instances, the reception of user-held devices 30a is poor, causing the accuracy of its navigation systems (e.g., GPS) to be degraded. Supplemental communication devices 30c may supplement or replace data from devices with poor reception or accuracy, particularly, hand-held communication devices 30a, with higher accuracy ancillary turbulence and/or navigation/position data. Supplemental communication devices 30c may be for example small (e.g., 1 inch$^3$) devices with an accelerometer, a navigation system (e.g., GPS), communication circuit and antenna. Supplemental communication devices 30c may be mounted onto an airplane separably attached (e.g., detachable without substantially altering the joining surface) or inseparably attached (e.g., permanently affixed such that attempted detachment substantially alters the joining surface). Supplemental communication devices 30c may be mounted, e.g., by adhesive or suction, onto an inside of an airplane window to sense window vibrations and/or plugged into a docking station on an airplane dashboard. In one example, during operation, supplemental communication device 30c is fixed relative to the airplane and positioned at a location with relatively high reception (e.g., the cockpit) for the navigation systems (e.g., GPS). The above three distinct types of communication devices: hand-held 30a, embedded 30b and supplemental 30c, may be physically separate devices, each of different form and/or function, communicating wirelessly with each other, that may work together in tandem, or independently.

In some embodiments, hand-held device may collect sensor data from its native integrated sensors, from embedded aircraft system sensors coupled to embedded communication devices, and/or to supplementary sensors coupled to supplemental communication devices. In some embodiments, these different types of communication devices may generate different forms of information that server 100 converts and integrates into a uniform format or protocol. For example, embedded communication devices may relay barometric pressure information (e.g., elicited from other systems) to the server, which may convert the pressure information to altitude coordinates in the same format as recorded by satellite navigation systems such as GPS in hand-held and supplemental communication devices. In another example, supplemental communication device may be adapted for limited supplementary function, such as only providing positioning (e.g., GPS or GNSS) information, but not turbulence information.

In various embodiments, turbulence or position data from supplemental communication devices 30c may be used to verify, refine, replace or combine with, turbulence or position data from hand-held communication device 30a, or vice versa. In various embodiments, supplemental communication devices 30c may continuously or selectively and intermittently measure and/or transmit turbulence or position data. In some embodiments, supplemental communication devices 30c may only measure and/or transmit turbulence or position data, or its data may only be used by remote server 100 to compute the turbulence or position of its airplane, if the data reception or accuracy from other (e.g., hand-held or embedded 30a and/or 30b) communication devices is below threshold quality. In various embodiments, turbulence or position data from supplemental communication devices 30c may supplement (e.g., be used in conjunction with) or replace (e.g., be used instead of) turbulence or position data from other communication devices 30a and/or 30b. In various embodiments, server 100 may calculate turbulence on-board an airplane with two or more (e.g., hand-held and supplemental 30a and/or 30c) communication devices 30 by averaging turbulence data therefrom (e.g., weighing each device's contribution by a predetermined factor, according to a priority listing of devices related to their accuracy, or a real-time measurement of data reception or accuracy), or by (e.g., exclusively or primarily) using the smallest turbulence measurements therefrom (e.g., because turbulence mis-readings typically result in greater than actual, but rarely lower than actual, turbulence measurements). In various embodiments, server 100 may calculate position or navigation information for an airplane with two or more (e.g., hand-held and supplemental 30a and/or 30c) communication devices 30 by averaging the position information therefrom (e.g., weighing each device's contribution by a predetermined factor or a real-time measurement of data reception or accuracy) or by (e.g., exclusively or primarily) using the position information from the device with the greatest reception or accuracy. For example, server 100 may prefer or use navigation (e.g., GPS) information from a navigation systems (e.g., GPS) receiver with relatively better reception (e.g., in the cockpit) over navigation (e.g., GPS) information from a navigation systems (e.g., GPS) receiver with relatively worse reception (e.g., in the cabin). In one example, supplemental communication device 30c improves the average accuracy of position and navigation information from 85% accuracy (with a hand-held device 30a only) to nearly 100% accuracy (with both hand-held and supplemental communication devices 30a and/or 30c).

In some embodiments, the computation task of measuring turbulence and/or position data may be split between multiple (e.g., hand-held and supplemental) communication devices 30, thereby reducing the computational burden on any one individual device. For example, a first type of (e.g., hand-held) communication device 30 may be the exclusive device on-board the airplane to measure turbulence data and a second type of (e.g., supplemental or embedded) communication device 30 with the most accurate navigation (e.g., GPS) reception or accuracy may be the exclusive device on-board the airplane to measure the position or navigation of the airplane. Communication devices 30 with the best reception or accuracy may be determined by the on-board devices themselves (e.g., each individually comparing its reception or accuracy to performance thresholds), by multiple on-board devices (e.g., collectively sharing and comparing their relative accuracy or reading information), or by remote server 100 (e.g., using challenge-response test readings or passively received readings to determine one or more optimal devices). In embodiments where server 100 remotely manages optimal communication devices 30, server 100 may send optimal or sub-optimal performing devices on-board an airplane a transmission to respectively start or stop measuring all or specific data, for example, for a predetermined timeout duration of time, or until its recording accuracy or reception reaches a threshold level. In some embodiments, each individual device 30 may store performance threshold ranges and may selectively measure when its turbulence or position/ navigation information are within those threshold ranges (e.g., when its turbulence data is consistent with other measuring devices, when turbulence level fluctuations are below threshold, and/or when the position information is measured with above threshold precision or below threshold uncertainty), and may stop measuring when the information is outside those threshold ranges. Such selective measurement may also reduce computational burden and memory storage in communication devices 30 by preventing the device from measuring and storing data continuously, even when its data is sub-optimal data and cannot be used (or used with negligible weight) by server 100 to generate turbulence map data.

Communication devices 30 such as hand-held user equipment may communicate via a Wi-Fi access point 40 that may be available continuously or intermittently during a flight of airplane 10A (or after the flight when the plane has landed). Access point 40 may communicate with a communication satellite 20B which in turn transmits the data to a terrestrial station 80 which connect to a remote server 100 over network 90 which may be, but not necessarily, the Internet. Additionally or alternately, communication devices 30 such as transponders embedded in embedded airplane communication systems may transmit turbulence data to ground control devices via radio or satellite. Additionally or alternately, supplemental communication devices 30 may relay turbulence and/or navigation data via other (e.g., hand-held or embedded) communication devices 30, e.g. by local communication such as Wi-Fi or Bluetooth™. In other embodiments, supplemental communication devices 30 may transmit data directly via Wi-Fi access point 40 to remote server 100. Turbulence data may be transmitted over these communication channels, for example, periodically, when there is a threshold change in detected turbulence values, and/or, if communication is temporarily unavailable, upon reestablishing connectivity. In some embodiments, supplemental communication devices 30 may transmit data continuously and/or upon receiving a request for data, e.g., from an accompanying communication device 30 or remote server 100, such as, when the accompanying communication device 30 has a below threshold sub-optimal accuracy or reception.

While most airplanes 10A-10E communicate via a communication satellite 20A, some airplanes such as 10F may communicate (possibly using an inter-airplane communication system) via another airplane 10E which serves as a network node between airplane 10F and communication satellite 20A. Additionally, some communication devices 33, 35, and 37 may be located remotely outside the aircrafts, either as stationary sources of data or terminals (e.g., weather stations, airline operation terminals and/or ground control terminals) on which data is displayed. In some embodiments, turbulence data may be obtained, either manually or automatically, from communication devices 33, 35, and/or 37, for example, as third party sources other than the on-flight communication devices.

Remote server 100 may include one or more memor(ies) 102 or database(s) 110 for storing turbulence data and processing instructions and one or more processor(s) 104 for executing the instructions. Remote server 100 may be configured to receive the turbulence data from communication devices 30 on board airplanes 10A-10F over the communication channel Remote server 100 may generate and later update a tempo-spatial turbulence database 110 by super-positioning (or mapping) the turbulence data received from the plurality of communication devices 30 onto a single tempo-spatial frame of reference. Turbulence data may be represented, for example, by values identifying intensity, source of data (manual or automatic), time, and further metadata describing the turbulence data. In some embodiments, each turbulence data sample recorded by communication devices 30 and/or received by remote server 100 may be indexed or identified by coordinates of position and time at which the data was recorded. For example, database 110 may store information representing a four-dimensional data array which maps global positioning system geographic coordinates (x, y), altitude (z), and time (t) into turbulence data. Additionally or alternatively, communication devices 30 may record and remote server 100 may receive a pre-defined flight trajectory, for example, for each distinct linear or curvilinear flight path with a constant velocity and/or acceleration, and a time at which each record was recorded, from which remote server 100 may calculate the position of each turbulence data sample. Remote server 100 may accumulate and combine readings from different trajectories and from different airplanes, for example, by rotating the axes of each sample set according to each distinct trajectory with respect to a common set of coordinate axes to fit together in a turbulence map or graph.

In some embodiments, communication devices 30 may measure raw turbulence data on board airplanes 10A-10F and send the raw data to remote server 100 (e.g., a ground station) where the raw data is processed and aggregated with data from the other aircraft, and distributed back to the communication devices 30 on board airplanes 10A-10F. In some embodiments, communication devices 30 may measure raw turbulence data and process the data (e.g., at the application level) on board airplanes 10A-10F and send the processed turbulence data to remote server 100 where the processed data is aggregated (e.g., and undergo further algorithmic attenuation), and distributed back to the communication devices 30 on board airplanes 10A-10F.

Remote server 100 may then distribute the accumulated turbulence data stored on the tempo-spatial database 110 to communication devices 30. The distributed data may be provided in various forms of processing. In one embodiment, remote server 100 may distribute an entire set of turbulence data, for example, accumulated from communication devices 30 on all available airplanes 10A-10F or for all available areas, times, and/or altitude ranges. In another embodiment, remote server 100 may only distribute a subset of the turbulence data stored on the database 110, for example, for a subset of airplanes 10A-10F, areas, times, and/or altitude ranges, responsive to a specified request made by one or more communication devices 30, or for only new or changes in turbulence data values. For example, remote server 100 may distribute the subset of turbulence data along the route of the airplane in which the device is located (e.g., which may be predefined and/or updated automatically when rerouted). In other embodiments, remote server 100 may distribute raw turbulence data from other communication devices to communication devices 30, which may then accumulate the received turbulence data with its own stored turbulence data locally. An example of the data structure for storing the turbulence data and a visual representation thereof will be described in further details hereinafter.

Data may be transmitted securely between communication devices 30, access points 40, satellites 20A-20B and/or terrestrial station 80, for example, using data authentication or encryption mechanisms at the sending and/or receiving device, such as, for example, password-protected logins, public and private keys, encryption functions, digital signatures, digital certificates, firewalls or other security mechanisms. In one embodiment, turbulence data may be transmitted in a secure manner using Hypertext Transfer Protocol Secure (HTTPS) or secure sockets layer (SSL) communication (e.g., where HTTPS communication is not available). Upon starting an application, a processor (e.g., processor 34 or 104) may request and receive user login credentials, such as, a user name and password, entered by user 50. In some embodiments, a memory (e.g., memory 32, 102 or database 110) may store a list of one or more user identifications (IDs), device IDs or flight IDs that a processor (e.g., processor 34 or 104) pre-registered as allowed or barred. In some embodiments, the processor may request and receive a user's flight information and, e.g., together with the user's user name and password, may request verification of the user's credentials by an airline company and/or specific details for the flight, including a route and waypoints, against which the user's position data may be checked during the flight.

FIG. 3A is a flowchart diagram illustrating a method 300A for monitoring turbulence data in accordance with embodiments of the present invention. Method 300A may be executed using a processor (e.g., server processor 104 of FIG. 2) that is in communication with, and located remotely from, a plurality of in-flight communication devices (e.g., communication devices 30 of FIG. 2).

In operation 310A, a processor (e.g., processor 104 of FIG. 2) may receive turbulence data obtained by a plurality of communication devices (e.g., communication devices 30 of FIG. 2) during flights on-board respective ones of a plurality of airplanes (e.g., airplanes 10A-10F of FIG. 2). Each of the plurality of communication devices may independently receive or record turbulence affecting the airplane in-flight. The communication device may either receive the turbulence data manually, via an input from a human user or automatically, by measuring the temporal acceleration forces applied to the sensors of the communication device.

In operation 320A, the processor may generate accumulated tempo-spatial turbulence information by super-positioning the turbulence data received from the plurality of communication devices onto a single tempo-spatial frame of reference.

In operation 330A, the processor may distribute the accumulated tempo-spatial turbulence data information to one or more of the communication devices.

According to some embodiments of the present invention, the processor may distribute the accumulated turbulence data to be displayed on communication devices. In some embodiments, the processor may divide and distribute flight and turbulence data into segments of time. Each segment may represent a single turbulence level (e.g., in a range of 0-5) and the processor may create a new segment if the processor detects a change in the turbulence level and/or a change in the course/bearing of the flight by more than a predetermined threshold amount (such as, 2 degrees). Each segment may include one or more of: start and end coordinates, start and end altitude, start and end timestamp, and bearing. A segment may have a maximum duration (such as, 15 minutes), for example, to enable the processor to respond to queries that are time based, such as "show turbulence from the past 45 minutes."

According to some embodiments of the present invention, the turbulence data may include, for example, intensity level of the turbulence, geographic coordinates or spatial position of the turbulence, trajectory of the flight, altitude of the turbulence and/or time of the turbulence.

Figure 3B:
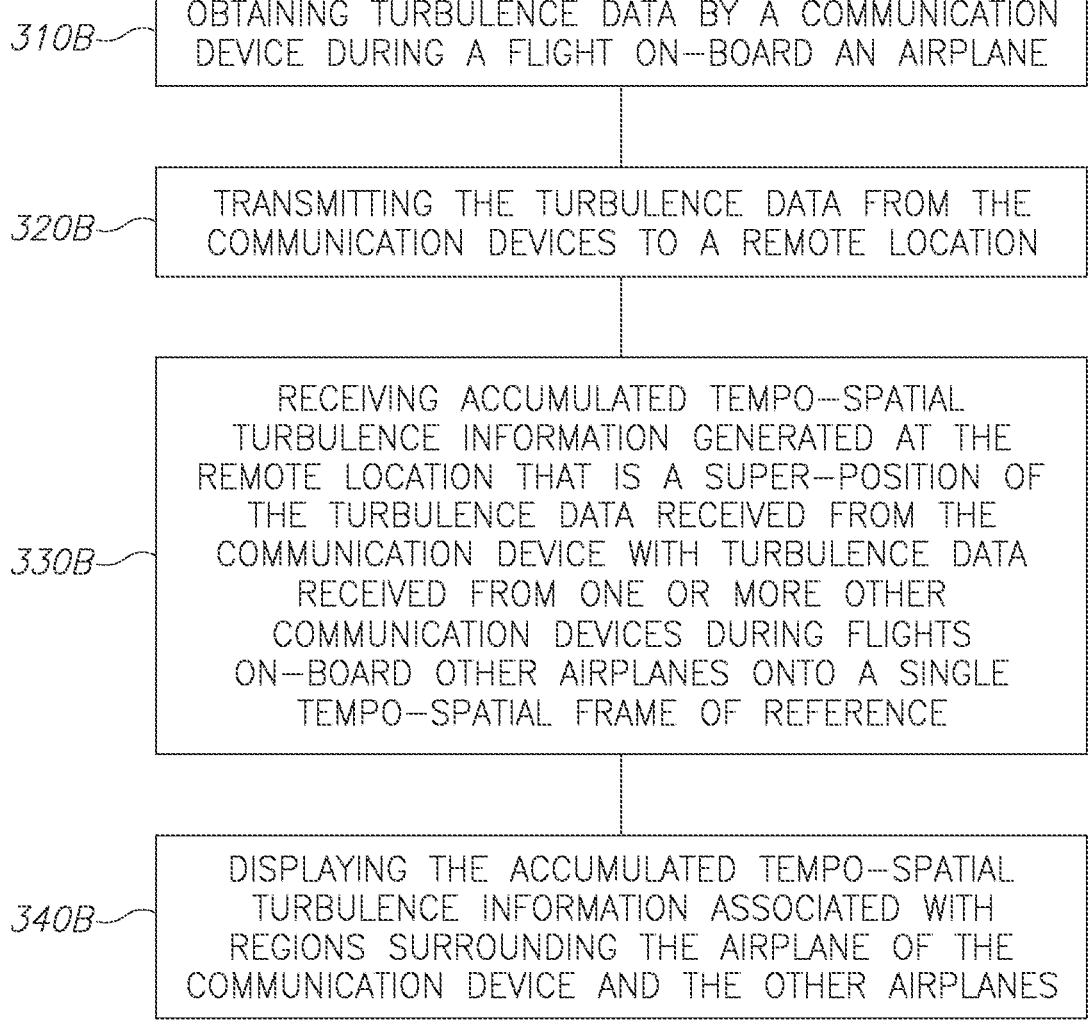
FIG. 3B is a flowchart diagram illustrating a method for obtaining and communicating turbulence data in accordance with embodiments of the present invention.

FIG. 3B is a flowchart diagram illustrating a method 300B for obtaining and communicating turbulence data in accordance with embodiments of the present invention. Method 300B may be executed using a processor (e.g., communication device processor 34 of FIG. 2) that is in communication with, and located remotely from, a centralized processing and distribution location (e.g., server 100 of FIG. 2).

In operation 310B, a processor (e.g., communication device processor 34 of FIG. 2) may obtain turbulence data during a flight on-board an airplane (e.g., airplane 10A of FIG. 2). Each of a plurality of communication devices may independently receive or record turbulence data while the airplane is in-flight. The communication device may either receive the turbulence data manually, via input from a human user or automatically, by measuring the temporal acceleration forces applied to the sensors of the communication device.

In operation 320B, a communication device (e.g., communication device 30 of FIG. 2) may transmit the turbulence data to a remote location (e.g., server 100 of FIG. 2).

In operation 330B, the communication devices (e.g., communication device 30 of FIG. 2) may receive accumulated tempo-spatial turbulence information generated at the remote location (e.g., server 100 of FIG. 2). The accumulated tempo-spatial turbulence information may be a superposition of the turbulence data received from the communication device with turbulence data received from one or more other communication devices during flights on-board other airplanes (e.g., airplanes 10B-10F of FIG. 2) onto a single tempo-spatial frame of reference (e.g., as generated in operation 320A of FIG. 3A).

In operation 340B, a display (e.g., of communication device 30 of FIG. 2) may display the accumulated tempo-spatial turbulence information associated with regions surrounding or along the route of the airplane of the communication device and/or the other airplanes.

Figure 4:
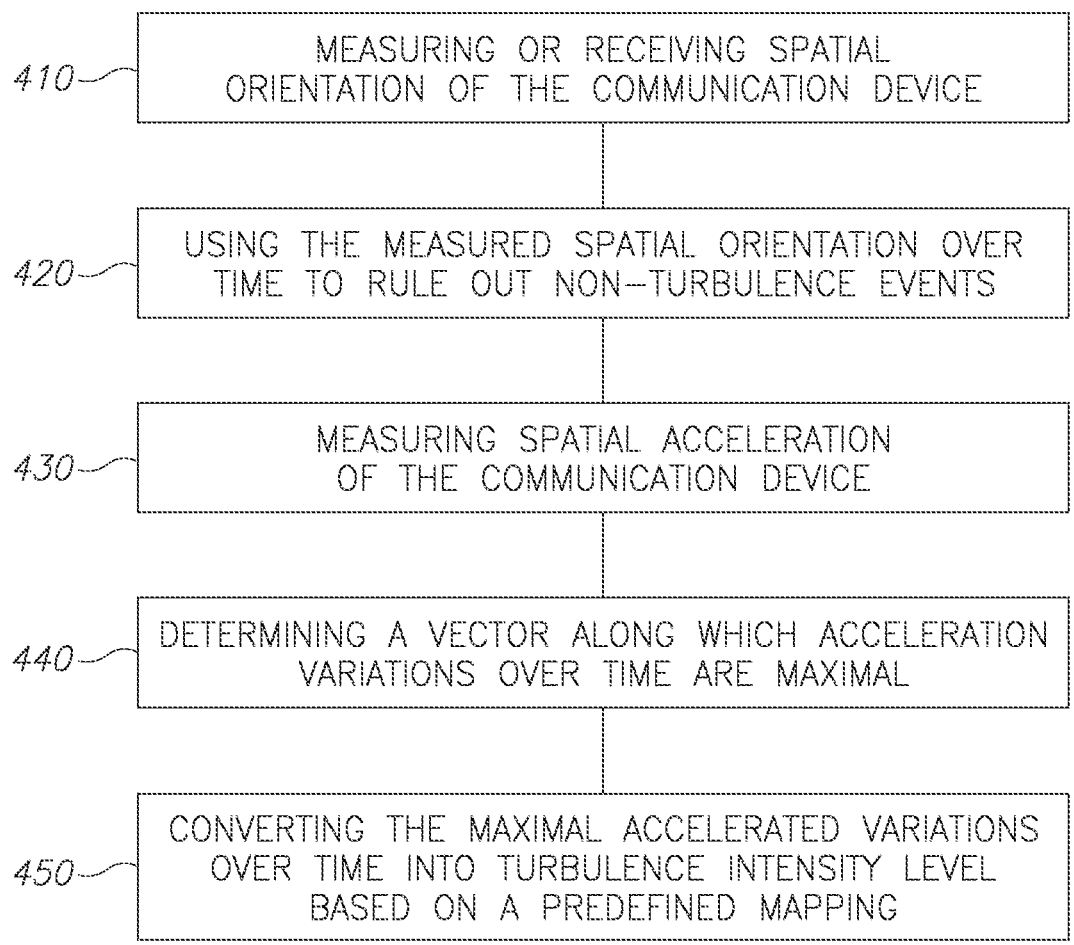
FIG. 4 is a flowchart diagram illustrating a conversion process in accordance with embodiments of the present invention.

According to some embodiments of the present invention, the turbulence data may be generated, for example, by obtaining spatial acceleration data associated with the communication devices, respectively, and converting the spatial acceleration data into turbulence data, based on a conversion process described in reference to FIG. 4.

FIG. 4 is a flowchart diagram illustrating a conversion process 400 in which kinematic data such as acceleration is converted to turbulence values or levels, in accordance with embodiments of the present invention. Process 400 may be executed using a processor (e.g., server processor 104 and/or client device processor 34 of FIG. 2).

In operation 410, a processor (e.g., communication device processor 34 of FIG. 2) may measure or a processor (e.g., server processor 104 of FIG. 2) may receive spatial orientation data of a communication device (e.g., communication device 30 of FIG. 2).

In operation 420, the processor may use the measured spatial orientation data over time to identify turbulence events or rule out non-turbulence events, for example, movement of the communication device independent of and/or relative to the airplane.

In operation 430, the processor may measure spatial acceleration of the communication device during turbulence events.

In operation 440, the processor may determine a vector along which acceleration variations over time are maximal. In some embodiments, in addition or alternatively, the processor may preselect a fixed vector, for example, the vertical vector, with respect to the coordinate space of the airplane and/or the Earth, and determine a maximal acceleration variation along (only) that vector.

In operation 450, the processor may convert the maximal accelerated variations over time into turbulence intensity level based on a predefined mapping.

According to some embodiments of the present invention, the determining of a vector along which variations of the acceleration are maximal (operation 440) may be carried out in order to detect the full effect of the turbulence since turbulence events are characterized with chaotic variations of acceleration, and it may be desirable to detect the full magnitude of the turbulence so as to associate the correct intensity level to the transmitted turbulence data (operation 450). In order to achieve that, the conversion process may include measuring or receiving the spatial orientations of the communication devices (operation 410), respectively, and determining the acceleration variations given the measured spatial orientation (operation 430). It may be the case that the turbulence events are vertical and so some of the orientation measurements are directed at locating the acceleration components along the vertical axis of the aircraft.

According to some embodiments of the present invention, one objective of using the measured spatial orientation over time is to identify turbulence events or rule out non-turbulence events (operation 420). Changes of orientation during non-turbulence events may be due to a user moving the communication device independently of the movement of the airplane. These movements typically have their own motion pattern and their effect may be filtered out from the overall change in acceleration, to provide a correct value of turbulence. In some embodiments, a processor (e.g., communication device processor 34 or remote server processor 104 of FIG. 2) may identify communication device (e.g., communication device 30 of FIG. 2) movements relative to the airplane by measuring rapid changes in device orientation. At any given moment, the processor may request and/or receive information about its orientation in space, for example, including angles along its three axes. When the communication device is at rest (identified by very small changes in the acceleration along all of its axes), the processor measures the angles along its three axes. When the processor identifies that there is a change in one of the angles, it starts measuring the time. When the change stops, the processor checks if one of the angles has changed by more than a predetermined threshold configured value. If the change is higher, the processor checks the speed of the change by measuring the time difference. If the speed is higher than the configured value, the processor may determine that the change is caused by movement of the communication device and not the airplane and may be eliminated as a non-turbulent event. After a non-turbulent event is detected, if the processor does not detect an ongoing orientation change for at least a predetermined amount of time, the processor may determine that the communication device is at rest again. The processor may reset all turbulence data to no turbulence in a preconfigured period before an identification of a first movement. The processor may also reset all samples of turbulence data after the end of the movement to no turbulence for a preconfigured period. In one example, a communication device may be lying flat causing the processor to detect angles of zero along the X and the Y axes. If a user picks up the communication device and looks at it, this movement may change the angles from zero to about 30-40 degrees along the Y axis over the course of approximately 1 or 2 seconds. The processor identifies the rapid change in angle as a device motion event, not a turbulent event. After the device is at rest for a predetermined threshold of time (e.g., 3 seconds), the processor may clear or cancel turbulence data recorded over a predetermined past time period (e.g., 3 minutes) and/or future time period (e.g., 1 minute). In some cases, for example, if the predetermined past time period is greater than the periodic transmission interval, the communication device may transmit non-turbulent motion data to the remote server before it is identified. The processor may then send the remote server a cancellation signal to delete or ignore non-turbulence data segments. In some embodiments, the processor may recognize when the device is fixed or mounted to the airplane (e.g., releasably secured to a dashboard mount in the cockpit) and may deactivate or skip non-turbulent motion detection processes.

According to some embodiments, additionally or alternatively to the above embodiments, turbulence events may be differentiated from non-turbulence events (operation 420) by comparing turbulence data from multiple communication devices. In one embodiment, a three-dimensional (3D) map may be divided into cells, regions, or "tiles" of airspace above geographic regions of the Earth. Tiles may be 3D shapes (e.g., when viewed in perspective) or 2D shapes (e.g., when viewed along constant altitude cross-sections, constant latitude cross-sections or constant longitude cross-sections). In one example, the airspace map may be divided into cubic (3D) or square (2D) tiles that vary in size depending on latitude (lower latitude tiles having smaller dimensions, such as, $15^3$ miles, and higher latitude tiles having larger dimensions, such as, $35^3$ miles). In other embodiments, tiles may have a cylindrical (3D) or circular (2D) shape, rectangular prism (3D) or rectangular (2D) shape, or any other shape. The sizes, dimensions or aspect ratios of the tiles may be fixed or set as an adjustable parameter for higher or lower turbulence data resolution. Turbulence data may be constant across each tile and may be defined by discrete values (such as levels 0-5) or continuous values. Turbulence data may be visualized on the turbulence map by a color corresponding to the discrete or continuous value. Each communication device records turbulence values for the tile representing the region in which it is located, for example, assigning values or "coloring" the tiles along its trajectory.

Embodiment of the invention may be used to correct "false positive" turbulence events (e.g., detecting turbulence when there is none, or detecting a higher level of turbulence than exists). False positives may occur, for example, when the recording device moves independently relative to the airplane (e.g., the device velocity being different than the airplane velocity ($V_{device} \neq V_{airplane}$) and its independent motion is mimics airplane turbulence). False positives may be caused, for example, by human motion, typing or playing games with the device, dropping the device, jostling the device or otherwise moving the device during a flight. Embodiments of the invention recognize that, whereas false positive turbulent events are possible, "false negative" turbulent events are rare or impossible. During turbulence, it is difficult or impossible to stabilize a device to decrease or negate turbulence. That is, one cannot fake smooth motion when turbulence exists. Embodiments of the invention utilize this understanding by prioritizing or selectively reporting lower turbulence measurements over higher turbulence measurements.

A process (e.g. operation 420) or a processor (e.g. processor 34 and/or 104) may set the turbulence value in each region or tile to be the lowest or minimum reported turbulence value detected by all communication devices on-board one or more airplanes traveling through that region within a predetermined period of time. In some embodiments, the process or processor may selectively update a region's turbulence value(s), for example, only decreasing the value if a lower value is subsequently reported, but not increasing this minimum value, within a black-out or lock-out period of time (e.g. 1-30 minutes). In some embodiments, the process or processor may wait until the expiration of the lock-out time period and set the turbulence value for the airspace region to be the minimum reported value for that region within the lock-out time period. In some embodiments, the process or processor may determine the turbulence value for the airspace region based on an absolute or weighted average of the reported values for that region within a predetermined time period. The weighted average may assign relatively higher weights to relatively lower turbulence values and relatively lower weights to higher turbulence values. In another embodiment, the turbulence value may be averaged based on a subset of reported values for that region, for example, averaging only values that are within a predetermined range of the lowest (or middle) reported turbulence value for that region within a predetermined time period.

The duration of the lock-out time period may be preset/fixed or adjustable/ dynamic The duration of the lock-out time period, for example, may be commensurate with an amount of time in which air patterns change and may be a static preset duration of typical or average air pattern changes or may be dynamic, for example, altered based on real-time weather patterns.

According to some embodiments, the process or processor may selectively correct turbulence events, only updating turbulence events that decrease (not increase) turbulence values for the same airspace region within the period of time. For example, a first airplane that crosses an airspace region during the period of time, may have an on-board communication device that detects a turbulence value (such as, level 3 turbulence). The turbulence value for that airspace region may be set (e.g. to level 3, indicated by a corresponding color on the turbulence map) instantly or upon the expiration of the time period. If a second airplane crosses the airspace region and has an on-board communication device that records a lower turbulence value (such as, level 1 turbulence) than is recorded on-board the first airplane, the process or processor may lower or reduce the first airplane's higher value with the second airplane's lower value for that airspace region. If however the communication device on-board the second airplane records a turbulence value greater than (or equal to) the first airplane's turbulence value (such as, level 5 turbulence), the second airplane's greater (or equal) value will be ignored and not override the first plane's lower value. The override instructions may be executed by processor or for the process, for example, as:

// For two or more turbulence values measured by two or more communication devices on two or more respective airplanes (or on-board the same airplane) in the same airspace region within a predetermined period of time:
  // if a second turbulence value measured by one communication device at a second later time is greater than or equal to a first turbulence value measured by a different communication device at a first previous time, do not override the first turbulence value (ignore the second turbulence value);
  // if the second turbulence value is less than the first turbulence value, override the first turbulence value with the second turbulence value;
  // if the second turbulence value is equal to the first turbulence value, validate the first turbulence value or do nothing.

Accordingly, embodiments of the invention may benefit from multiple communication devices serving to validate or override each other's turbulence data. The multiple communication devices may be on-board different airplanes or on-board the same (single) airplane.

A single device may also override its own turbulence measurements. For example, during a period of time within the same airspace region, a single communication device may detect or report multiple turbulence measurements. The process or processor may only accept a minimum of these measurements and ignore all greater than or equal measurements (if all measurements are received at once) or may selectively update the turbulence value for the region if (e.g., and only if) a subsequently measured value is less than a previously measured value (if the measurements are reported or detected sequentially).

In some embodiments of the invention, the period of time may be constant (e.g. resetting every preset number of minutes). In other embodiments of the invention, the period(s) of time may reset upon each new measurement (e.g., lasting a preset duration from the most recent recording).

According to some embodiments of the present invention, obtaining the turbulence data may be executed responsive to manual input by respective users of the communication devices. In such embodiments, a user (e.g., a pilot) may report turbulence as they experience it. In further embodiments, the manual input may include additional data relating to potential flight disturbances other than turbulence, such as cloud coverage (e.g., 350 and 360 indicating altitudes of 35,000 and 36,000 ft., respectively) or wind shear.

Figure 5:
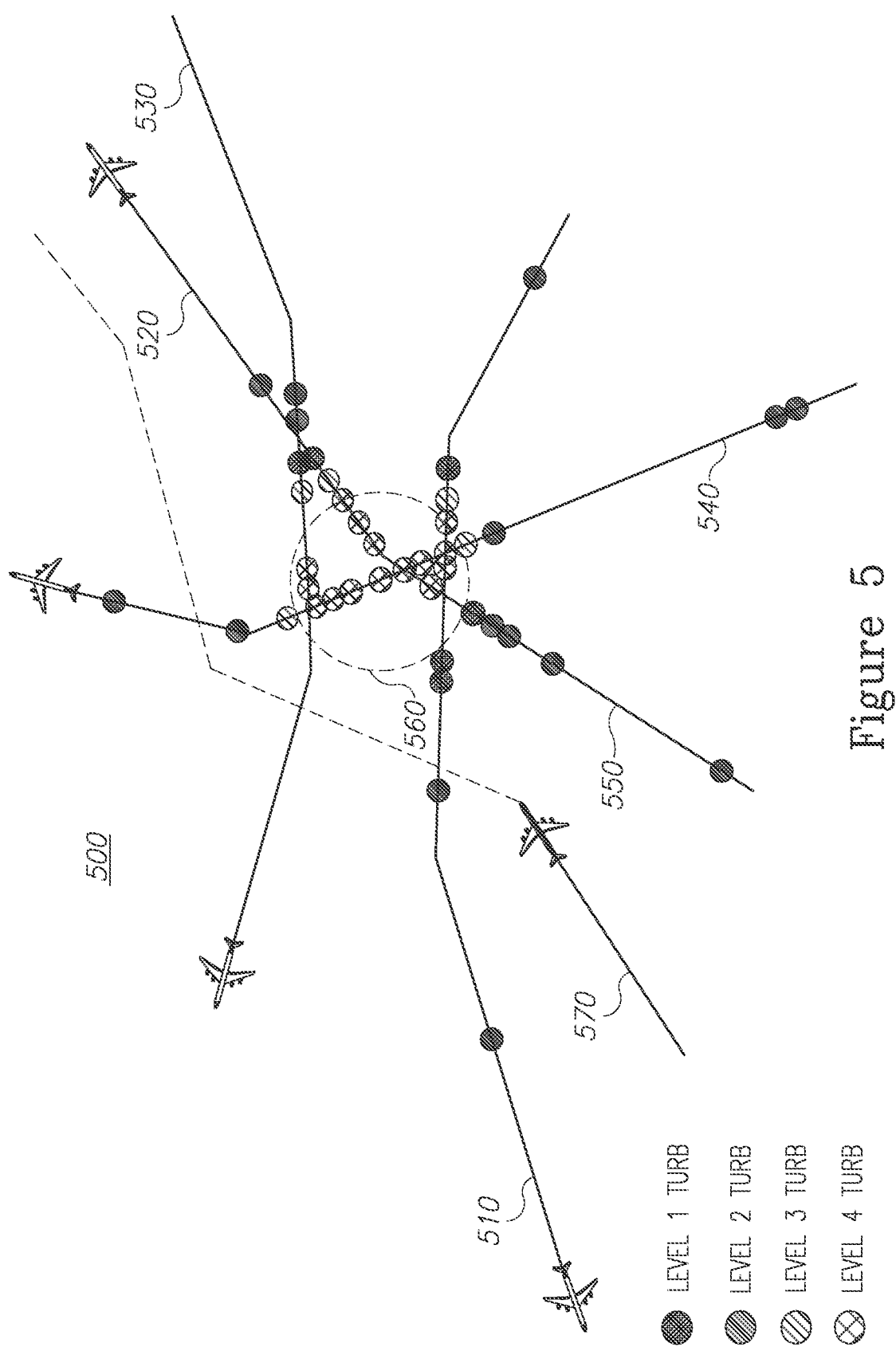
FIG. 5 is a schematic diagram illustrating a plurality of turbulence data samples obtained during several flight routes used to derive coverage of a specific area of turbulence data in accordance with embodiments of the present invention.

FIG. 5 is a schematic diagram illustrating a plurality of turbulence data samples obtained during several flight routes used to derive turbulence data covering a specific area in accordance with embodiments of the present invention. FIG. 5 shows a map 500 of five different flight routes 510-550 representing flights during which turbulence data was collected according to embodiments described herein. Region 560 shows turbulence data accumulated from the various flight routes 510-550 so as to provide turbulence data over a larger area than would be provided using a single flight route. In the example of FIG. 5, region 560 contains turbulence data samples indicating "level 4" turbulence. The turbulence data regarding region 560 may be used by a pilot of the airplane on route 570 (solid line) to divert to an alternative route (broken line) and thus avoid turbulent area 560.

According to some embodiments of the invention, a processor (e.g. processor 34 and/or 104) may use turbulence data from multiple communication devices in different planes (or within a single airplane) within the same airspace region to validate or override each other's measurements, for example, to avoid "false positive" turbulence data. In the example in FIG. 5, if subsequent to flight 520 recording a turbulence value (e.g. level 4) in region 560, flight 570 traversed region 560 and recorded a lower turbulence value (e.g. level 3) than flight 520, the processor would update the turbulence value for region 560 to be the lower of the multiple turbulence values (e.g. level 3). If however, flight 570 recorded a greater (or equal) turbulence value than flight 520 (e.g. level 5), the processor would ignore the flight 570 measurement.

In some embodiments, turbulence data from various flights may be used to validate the turbulence samples coming from proximal locations and sample times of the data. It should be understood that a plurality of flights may be used to collect turbulence data, which is used to update the database at the remote server, for both accumulating and further analysis as will be explained below.

Figure 6:
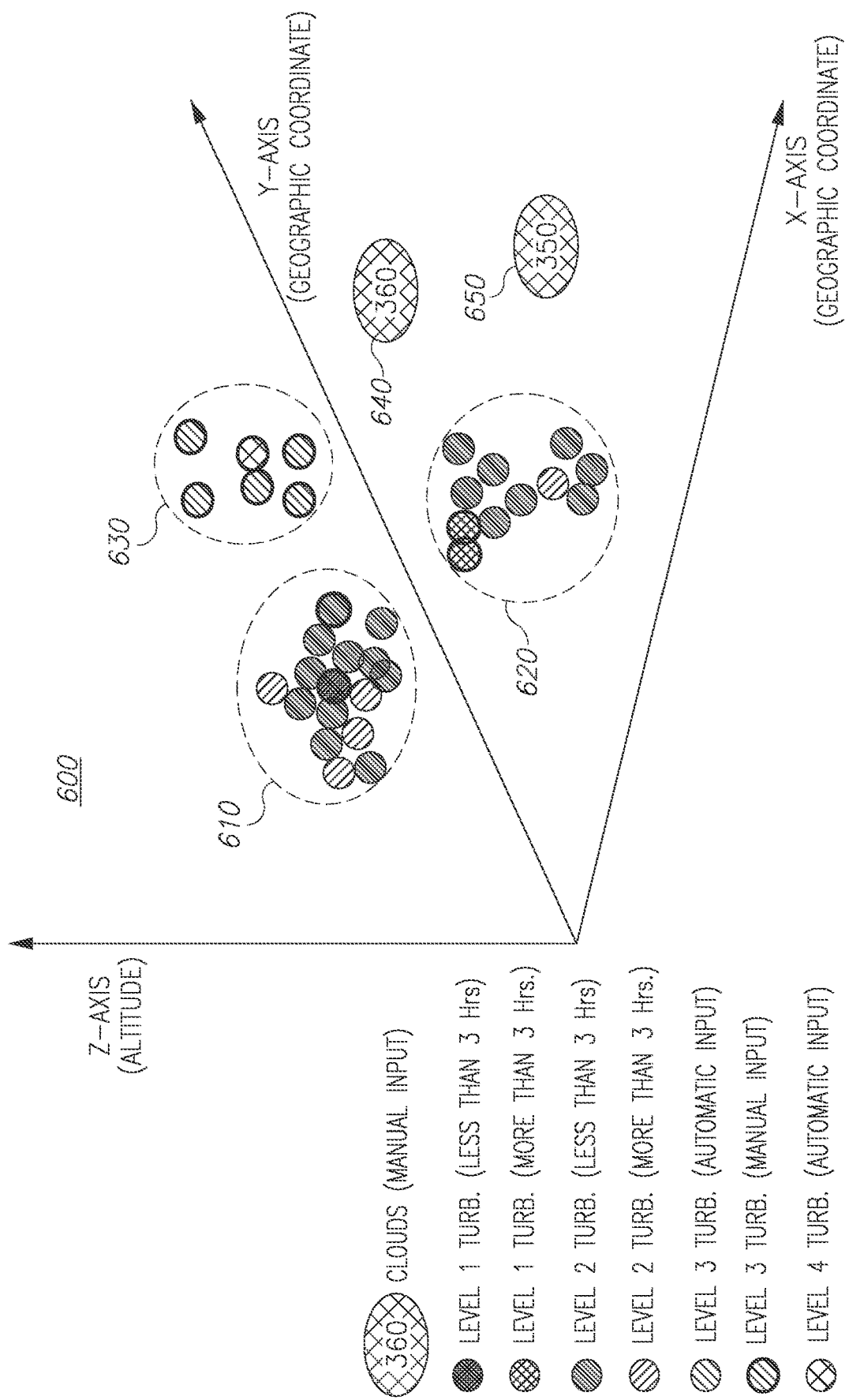
FIG. 6 is a graph diagram for super-positioning turbulence data received from a plurality of communication devices in accordance with embodiments of the present invention.

FIG. 6 is a graph diagram 600 for super-positioning turbulence data received from a plurality of communication devices in accordance with embodiments of the present invention. Graph 600 may represent position data in the form of a three dimensional array with axes x and y representing latitude and longitude geographic coordinates and the z axis representing altitude. As turbulence data is received, the data may be mapped onto a common frame of reference, possibly in clusters of samples 610, 620, and 630 each representing turbulence data from a plurality of flights proximal to each other either in space or in time. Each sample is associated with several attributes such as turbulence intensity, altitude, and time of collection. Other non-turbulence data, such as, cloud coverage or visibility 640 and 650 may be stored. The legend at the lower left corner of FIG. 6 shows example and non-limiting attributes that may be associated with the turbulence data samples.

Figure 7:
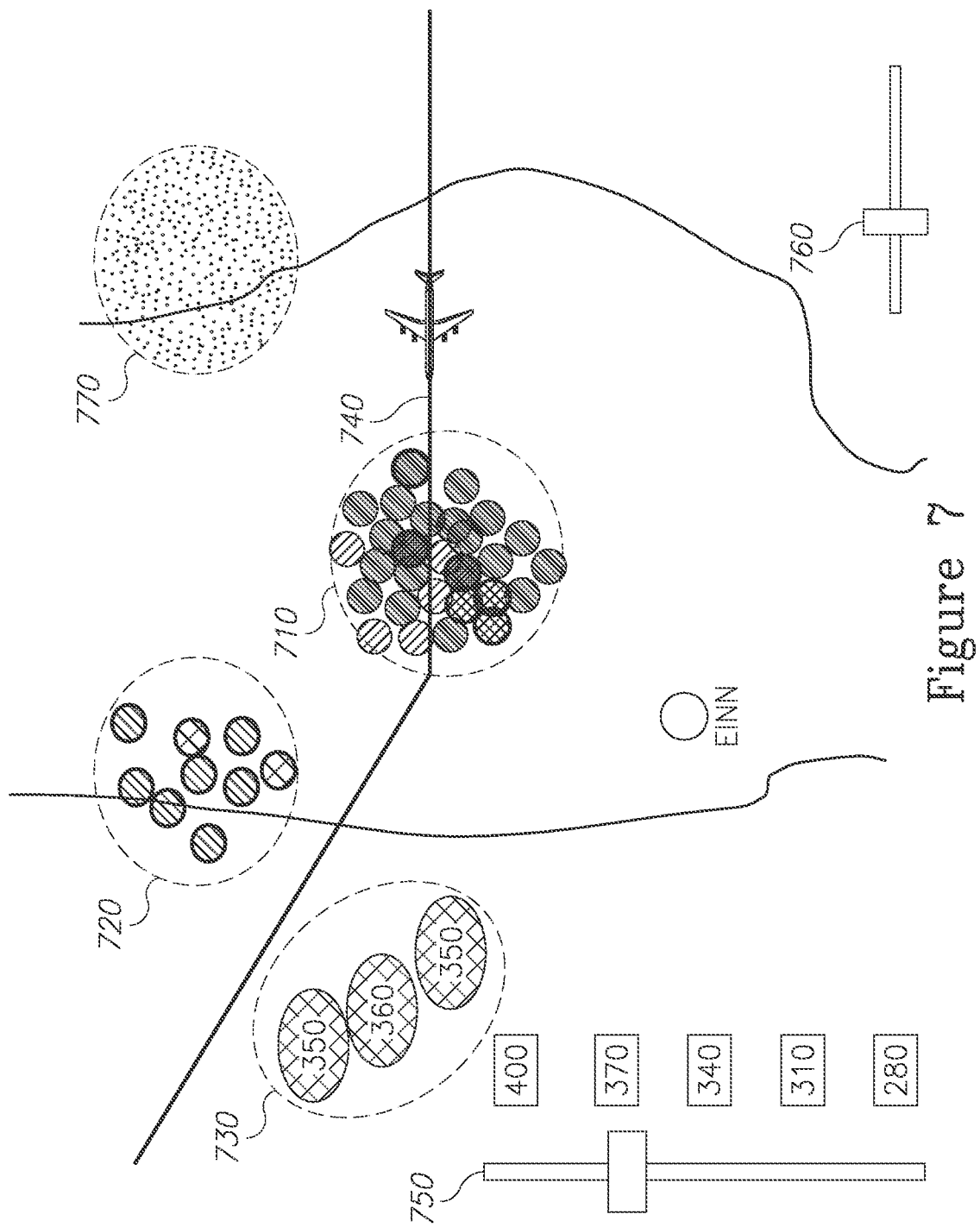
FIG. 7 is map diagram illustrating a visual representation of turbulence data in accordance with embodiments of the present invention.

FIG. 7 is a map diagram illustrating a visual representation of turbulence data in accordance with embodiments of the present invention. The map diagram may be generated based on the data distributed by a remote server (e.g., server 100 of FIG. 2) and may be displayed on one or more communication device (e.g., communication devices 30 of FIG. 2). In the example of FIG. 7, flight route 740 is shown as entering a cluster of visual indicators 710 all of low level turbulence while avoiding a cluster 720 of high level turbulence. A volcanic ash area 770, possibly identified by third party sources, and cloud coverage 730, with their respective altitude indicated, may also be displayed.

Some embodiments of the invention may provide a "passenger mode" or "passenger version" of functionality and security restrictions specific to passengers on-board an airplane, and/or a "flight crew mode" or "flight crew version" of functionality and security restrictions specific to pilots, flight attendants and other flight crew members on-board an airplane. Pilots and other flight crew are a restricted group of members who can typically be trained and trusted to properly operate their communication devices, and may have dedicated equipment to optimally operate their communication devices (e.g., a docking station in the cockpit to mount the device substantially stationary relative to the airplane). In contrast, passengers generally have no airplane docking stations and often induce false turbulence events caused by common passenger usage of their devices, such as, typing or playing games or moving around during the flight. Recording these false turbulence events may reduce system reliability by showing inflated turbulence data, which could potentially cause pilots to take sub-optimal routes. Accordingly, embodiments of the invention may selectively accept or accumulate turbulence data from only authenticated, trusted sources or otherwise verified data. In some embodiments, turbulence data received from flight crew version devices operated by a pilot or other member of the flight crew may be trusted and automatically self-authenticated based on flight crew security privileges, whereas turbulence data received from passenger version devices operated by passengers may be untrusted based on passenger security privileges or may require further verification or security by server 100 to ensure the veracity of the passenger turbulence data.

In some embodiments, server 100 may output the same full view of the turbulence map data (e.g. see map data output in FIG. 7) on both the passenger and flight crew versions of communication devices, but may input, trust, or accept, a more restricted set of data from passenger devices than from flight crew devices (e.g. see data input in FIG. 6). In some embodiments, server 100 may compute airplane turbulence information using all or only turbulence measurements received from pilot or flight crew version devices, but none or a subset of turbulence measurements (e.g., rejecting at least some turbulence measurements) received from passenger version devices. In some embodiments, turbulence data from a flight crew version device may only be trusted and used by the server when the device is docked into the pilot's docking station (e.g., and not when it is undocked) to ensure the turbulence measurement is caused by airplane motion and not by human motion. In various embodiments, the server or communication device may recognize when the device is properly docked into the docking station, for example, using an electrical contact or an active or passive transmitter in the docking station that sends information to the communication device verifying that the device is properly docked, or a code, biometric data, or other confirmation, manually entered by the pilot. In some embodiment, the device may append the docking station or verification code (or a signature derived therefrom) to verify that a docked device collected the turbulence data (otherwise, turbulence data transmitted with no docking verification code may be ignored or weighed less by the server in its turbulence calculations). In some embodiments, the server or communication device may recognize when the communication device is not docked into the docking station, for example, when the orientation or angle (e.g., of the screen surface) of the communication device is within one or more threshold angle ranges (e.g., 0-30° relative to the horizon) beyond which it is unlikely to be caused by turbulence. For example, a device oriented approximately horizontally (e.g., 0-30°) is most likely held by a user (un-docked), because if it were docked (e.g., 90° relative to the airplane axis of motion) such an extreme orientation would indicate that an airplane is plummeting. In some embodiments, the server or communication device may measure the orientation or angle of the communication device by averaging or taking a coarse (e.g., relatively intermittent) sampling of the orientation measurements used for turbulence data. In other embodiments, the server may use turbulence measurements from the flight crew version of the device regardless of whether or not its docked and/or docking confirmation is received.

In some embodiments, while passengers can jostle handheld devices causing false turbulence events, passenger motion is confined to the airplane cabin and thus does not significantly alter the airplane's position information. Accordingly, server 100 may use passenger position information, but not passenger turbulence information (e.g., or a selective subset of passenger turbulence information), to generate turbulence map data (e.g., shown in FIG. 7), whereas server 100 may use both of the flight crew's position and turbulence information to generate turbulence map data. In some embodiments, because it is difficult to falsify the absence of turbulence or low turbulence, server 100 may use passenger turbulence information only when it indicates no turbulence or a lesser degree of turbulence than turbulence recorded by other trusted devices such as docked flight crew devices, embedded devices or supplemental mounted devices.

In some embodiments, the passenger version of the communication device may accept manually passenger-entered turbulence data, such as, an indication of whether or not there is a turbulence event and/or a level or intensity of the even on a scale (e.g., levels 1-4). While passengers are not affected by the jostling that induce false positives in passenger devices, passengers may suffer from human subjectivity. Each passenger may have a different tolerance or comfort with turbulence and so, passengers may be biased, report different ratings for the same turbulence levels. In addition, each person may move a different amount (e.g., a child's device may move much more than an adult's device, and some adults fidget more than others). To calibrate or normalize turbulence readings to each individual passenger, the server may learn the correlation between passenger's manually entered turbulence levels and actual turbulence measurements by comparing the levels passengers assign to events with actual turbulence readings, e.g., from accelerometers or sensors of trusted embedded or mounted devices. Once the system establishes a predictable mapping or correlation between an individual passenger's scoring and actual turbulence measurements, the system may adjust the passenger's scoring according to that mapping.

In some embodiments, each passenger may have a unique dynamic security profile or privileges. In some embodiments, the more trusted a user, the greater the passenger's turbulence information will be weighed to calculate the turbulence map data. For example, a passenger's security profile is improved or incremented when the passenger reports turbulence events that are confirmed by other trusted sources, e.g., a pilot's docket communication device, or an embedded or mounted communication device. Conversely, the passenger's security profile may be downgraded or decremented each time the passenger reports a turbulence event or reading that differs from that of the trusted devices (e.g., the passenger reports an event when the trusted device does not, or the passenger reports a turbulence level that is substantially higher or lower than that recorded by a trusted device). In some embodiments, passengers with a below threshold security level may only be used to validate turbulence measurements from other on-board trusted devices. However, once a passenger's security level exceeds a certain threshold, the passenger device may become a trusted device and its data may be used as the sole determinant of the turbulence on an airplane (e.g., to define the turbulence level when there is no other trusted device to verify that data). In some embodiments, the trusted passenger's device may be used to verify other passenger or flight crew device readings.

In various embodiments, turbulence data measured by a trusted device (e.g., e.g., a flight crew device, a docket flight crew device, a passenger device with above threshold security privileges, or an embedded or mounted communication device) may verify turbulence data measured by an untrusted device (e.g., a passenger device with below threshold security privileges). In some embodiments, the trusted device may verify data from an untrusted device on-board the same airplane recorded at substantially the same period of time. In some embodiments, turbulence data measured by a trusted device on-board one airplane may verify turbulence data measured by an untrusted device on-board a different airplane. For example, when two or more airplanes pass through a substantially similar location, region or zone within a predetermined time range, turbulence data recorded by a device on-board one of the airplanes may either validate or invalidate data recorded by a device on-board another of the airplanes.

In some embodiments, the "passenger mode" or "passenger version" has a quorum feature, wherein when a greater than threshold number of passengers on the same plane indicate substantially the same turbulence measurement, that measurement is trusted. This and other thresholds may be adjusted to balance the need for high security while not excluding too much data.

In some embodiments, turbulence data collected from a passenger version may be visualized in a turbulence map by a different color or translucency than turbulence data collected from a flight crew version (e.g., passenger readings are translucent and flight crew or embedded device readings are opaque).

Figure 8:
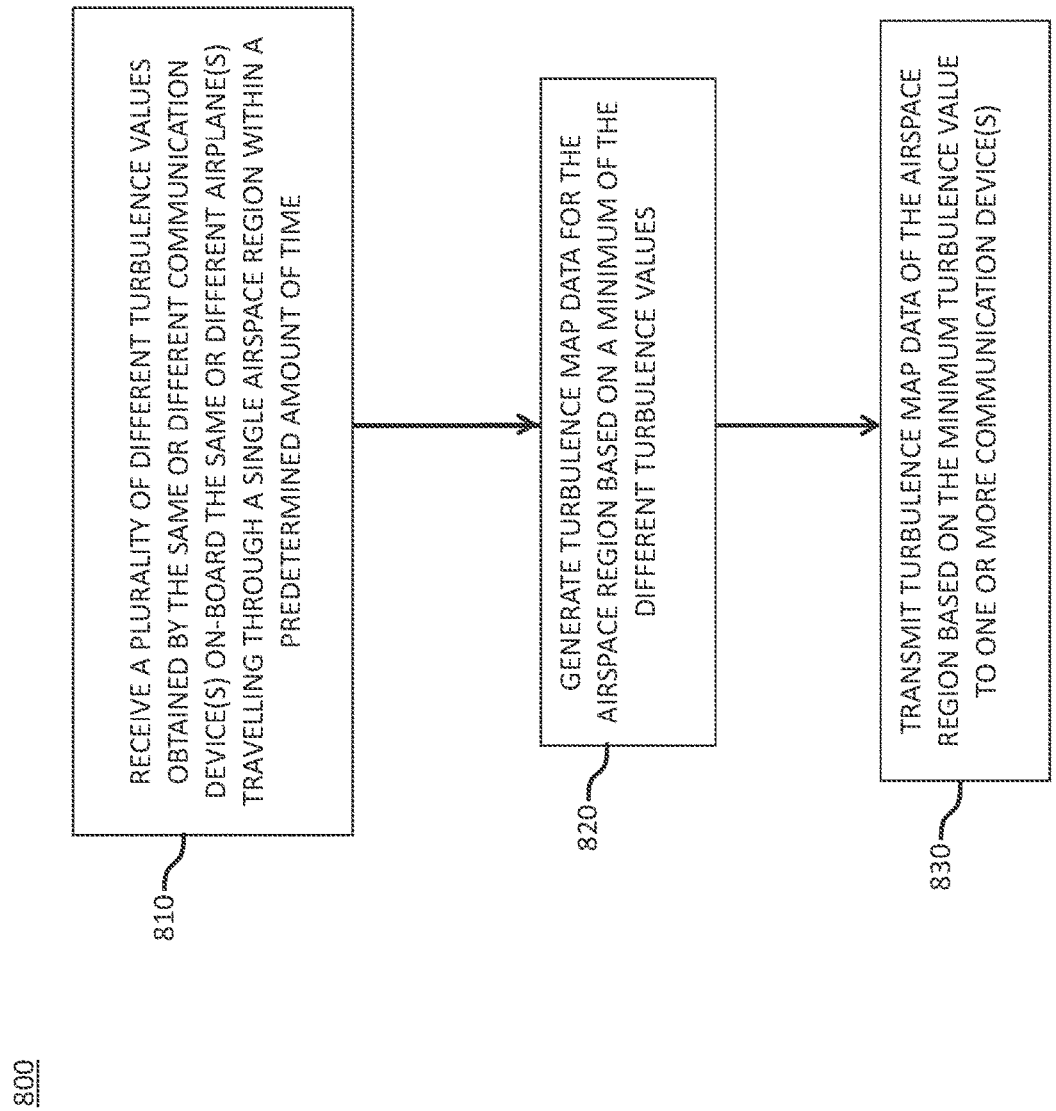
FIG. 8 is a flowchart diagram illustrating a method for correcting "false positive" turbulence events in accordance with embodiments of the present invention.

FIG. 8 is a flowchart diagram illustrating a method 800 for avoiding or correcting "false positive" turbulence events in accordance with embodiments of the present invention. Method 800 may be executed using a processor (e.g., server processor 104 of FIG. 2).

In operation 810, one or more processors (e.g., server processor 104 of FIG. 2) may receive a plurality of different turbulence values obtained by one or more communication devices (e.g., communication device 30 of FIG. 2) during flights on-board one or more airplanes (e.g., airplane 10A-F of FIG. 2) travelling through a same airspace region (e.g., region 560 of FIG. 5) within a predetermined amount of time (e.g., lock-out time period). The plurality of turbulence values may be received as sequential readings from a single communication device on-board a single airplane, from different communication device on-board the same airplane, or from different communication devices on-board respective ones of a plurality of different airplanes. Prior to operation 810, if no turbulence value has been recorded for the airspace region within a predetermined period of time, the processor may set the turbulence value or level for the airspace region based on the turbulence value received in operation 810, for example, instantly or upon expiration of the predetermined time period.

In operation 820, one or more processors (e.g., server processor 104 of FIG. 2) may generate turbulence map data for the airspace region based on a minimum of the different turbulence values received in operation 810. In one embodiment, the processor may set the turbulence value for the airspace region to be the minimum value received during the predetermined period of time and may, for example, based only on minimum turbulence values, ignore any non-minimum turbulence values. In one embodiment, the processor may selectively update the turbulence value for the airspace region by only decreasing the turbulence value if a lower value is subsequently received, but not increasing the turbulence value if a higher value is subsequently received, within the predetermined period of time. In one embodiment, the processor may wait until expiration of the predetermined period of time and set the turbulence value for the airspace region to be the minimum of the turbulence values. For example, if the processor has already set the turbulence value for the airspace region to be a first higher turbulence value, the processor may reduce the turbulence value assigned to the airspace region to be equal to, or a derivative of, a subsequently received relatively lower turbulence value. If no turbulence value has been set for the airspace region within the predetermined period of time, the processor may select the minimum turbulence value, i.e., the subsequent lower value, to be the turbulence value for the airspace region, and may ignore or delete the previously received higher turbulence value. In one embodiment, the processor may generate the turbulence map data based on an average of all or a subset of the plurality of turbulence values, for example, that are within a predetermined range of the minimum of the turbulence values. The average may be a weighted average in which relatively higher weights are assigned to relatively lower turbulence values and relatively lower weights are assigned to relatively higher turbulence values. In some embodiments, the subset of turbulence values may exclude a maximum turbulence value.

In operation 830, one or more processors (e.g., server processor 104 of FIG. 2) may transmit the turbulence map data of at least the single airspace region based on the minimum turbulence values generated in operation 820 to one or more communication device(s) (e.g., the same or different as the communication devices from which the turbulence values are received in operation 810). Communication device(s) may display the turbulence map data associated with regions surrounding or along the route of the airplane of the communication device and/or the other airplanes.

Figure 9:
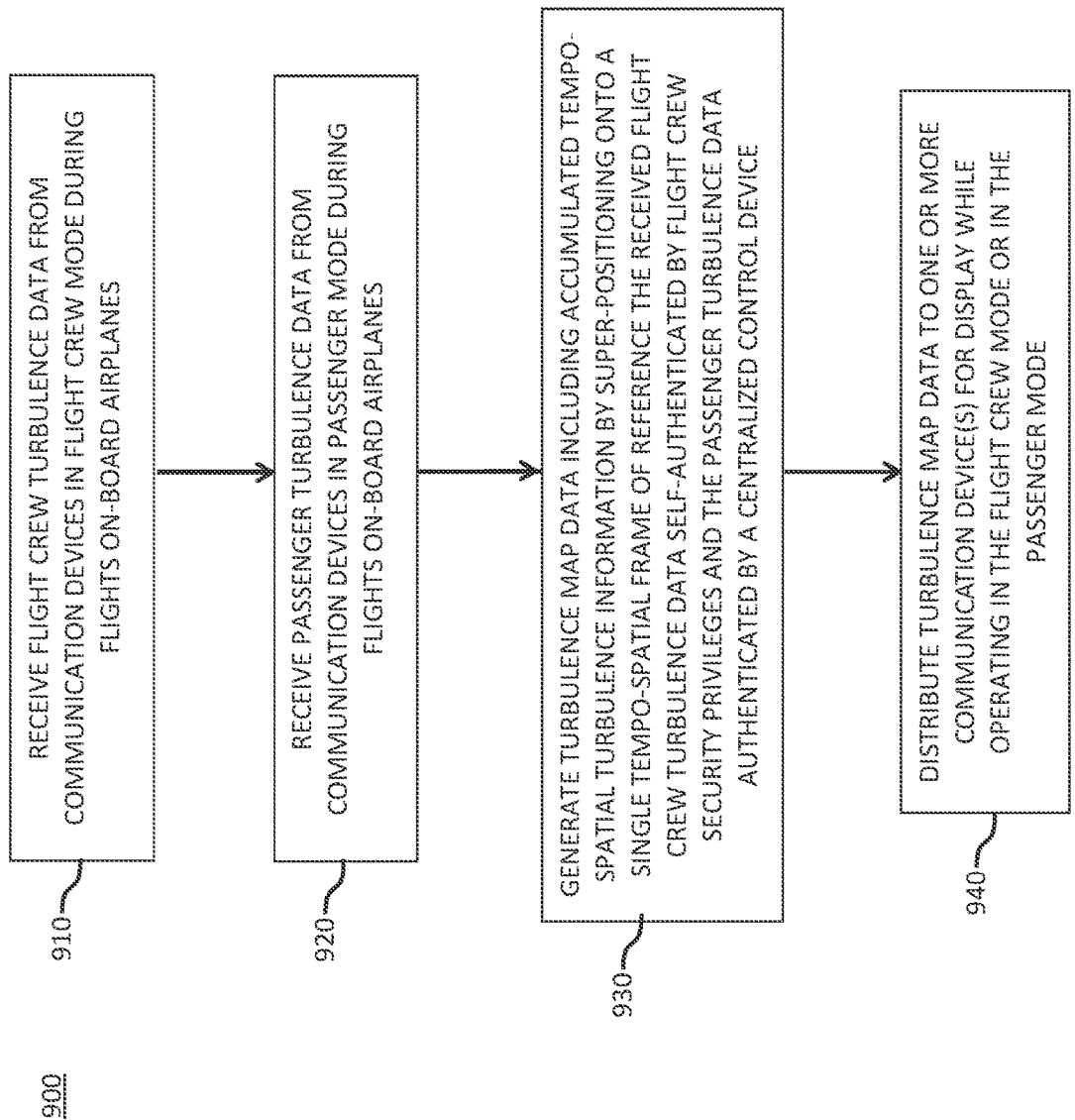
FIG. 9 is a flowchart diagram illustrating a method for communicating with a plurality of communication devices operating in a "flight crew mode" or a "passenger mode" in accordance with embodiments of the present invention.

FIG. 9 is a flowchart diagram illustrating a method 900 for communicating with a plurality of communication devices operating in a "flight crew mode" or a "passenger mode" in accordance with embodiments of the present invention. Method 900 may be performed using one or more processors (e.g., one or more processor(s) 104 of FIG. 2), which may be located at a centralized control device (e.g., server 100 of FIG. 2). In other embodiments, some or all operations of method 900 may be performed at other processors (e.g., communication device 30 processors 34 of FIG. 2).

In operation 910, one or more processors (e.g., server processor 104 of FIG. 2) may receive flight crew turbulence data from a plurality of communication devices operated by flight crew members in flight crew mode during flights on-board respective ones of a plurality of airplanes. The communication devices operating in flight crew mode may have flight crew security privileges that self-authenticate the integrity of the flight crew turbulence data.

In operation 920, one or more processors may receive passenger turbulence data from a plurality of communication devices operated by passengers in passenger mode during flights on-board respective ones of a plurality of airplanes. The communication devices operating in the passenger mode may have passenger security privileges that do not self-authenticate, but require the centralized control device to authenticate, the integrity of the passenger turbulence data.

In operation 930, one or more processors may generate turbulence map data including accumulated tempo-spatial turbulence information by super-positioning onto a single tempo-spatial frame of reference the received flight crew turbulence data self-authenticated by the flight crew security privileges and the passenger turbulence data authenticated by the centralized control device.

In operation 940, one or more processors may distribute the turbulence map data to one or more of the plurality of communication devices for displaying the distributed turbulence map data while operating in the flight crew mode or in the passenger mode.

According to some embodiments of the present invention, the visual representation may include a plurality of indicators superimposed on a map according to the respective locations at which the turbulence data was obtained or recorded.

According to some embodiments of the present invention, the indicators visually distinguish between various levels of turbulence intensity. This may be implemented, as shown here by using a predefined color, pattern or icon scheme. The same scheme may be used for all communication devices or different schemes may be used or changed for different respective communication devices.

According to some embodiments of the present invention, the indicators may further visually distinguish between at least one of: sample time of the turbulence data, and whether or not the turbulence data was obtained manually or by measuring acceleration of the respective communication devices.

According to some embodiments of the present invention, the visual representation may be altered responsive to user selection, for example, to only show the indicators of a specified altitude range, within a specified radius or flight route, or within a specified period of time.

According to some embodiments of the present invention, the visual representation may be altered, possibly using a graphical user interface (GUI) responsive to user selection, to only show the indicators of a specified level or range of turbulence level, or a specified altitude range (a non-limiting example may include GUI bar 750) or a specified time range (a non-limiting example may include GUI bar 760).

Although the network connection between the communication devices and the remote server may be continuous, according to some embodiments of the present invention, in a case that at least some of communication devices cannot temporarily establish a communication channel with the remote location, or in a case that no communication is available throughout the entire flight, the transmitting of the turbulence data by the at least some of communication devices may be delayed to when the communication channel becomes available (e.g., when an airplane access point is activated in flight or after landing upon gaining access to a communication network). At that time, turbulence data from the entire flight or only time periods when a connection was unavailable, may be transmitted to the server. The server may apply the past turbulence data to show turbulence in areas along flight paths where other airplanes are currently or are projected to pass.

In some embodiments, turbulence data measured by communication devices 30 on board airplanes 10A-10F may be accumulated and stored as a data pool (e.g., at database 110 or memory 102 of FIG. 2). The data pool may be operated by or associated with an airline or governmental organization, such as International Air Transport Association (IATA). The data pool may be accessed and/or updated by third party users, e.g., that are granted access or that have sufficient credentials or security clearance.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for communicating with communication devices operating in a flight crew mode or a passenger mode during flights on-board airplanes, the method comprising:
at a centralized control device:
receiving flight crew turbulence data from a plurality of communication devices operated by flight crew members in flight crew mode during flights on-board respective airplanes of multiple airplanes, wherein the communication devices operating in flight crew mode have flight crew security privileges that self-authenticate the integrity of the flight crew turbulence data;
receiving passenger turbulence data from a plurality of communication devices operated by passengers in passenger mode during flights on-board respective airplanes of multiple airplanes, wherein the communication devices operating in the passenger mode have passenger security privileges that do not self-authenticate, but require the centralized control device to authenticate, the integrity of the passenger turbulence data;
generating turbulence map data including accumulated tempo-spatial turbulence information by super-positioning onto a single tempo-spatial frame of reference the received flight crew turbulence data self-authenticated by the flight crew security privileges and the passenger turbulence data authenticated by the centralized control device; and
distributing the turbulence map data to one or more of the pluralities of communication devices for displaying the distributed turbulence map data while operating in the flight crew mode or in the passenger mode.

2. The method of claim 1 comprising authenticating the passenger turbulence data at the centralized control device by comparing the passenger turbulence data with turbulence data that is automatically measured by sensors of a trusted self-authenticating device.

3. The method of claim 2, wherein the trusted self-authenticating device is selected from a group consisting of: an airplane cockpit docked device, an airplane mounted device, an airplane embedded device, and one of the communication devices operating in flight crew mode.

4. The method of claim 1, wherein authenticating the passenger turbulence data at the centralized control device comprises determining that the passenger turbulence data reports a turbulence level that is less than or equal to a turbulence level reported by the flight crew turbulence data on-board the same airplane or a different airplane at substantially the same location and time.

5. The method of claim 1, wherein authenticating the passenger turbulence data by the centralized control device comprises authenticating a passenger operating the communication device by determining that the passenger has above threshold passenger security privileges.

6. The method of claim 1 comprising increasing the passenger security privileges for a passenger each time the passenger's communication device records passenger turbulence data that is verified against turbulence data recorded by a trusted self-authenticating device and decreasing the passenger security privileges for the passenger each time the passenger's communication device records passenger turbulence data that is contradicted by turbulence data recorded by the trusted self-authenticating device.

7. The method of claim 1 wherein the communication devices operating in flight crew mode self-authenticate the integrity of the flight crew turbulence data only when the communication devices are mounted into a flight crew docking station.

8. The method of claim 1, wherein the turbulence map data is generated based on position and turbulence information from the flight crew turbulence data and only position information from the passenger turbulence data without turbulence information.

9. The method of claim 1, wherein the flight crew turbulence data is automatically measured by sensors operably connected to the communication devices operating in flight crew mode.

10. The method of claim 1, wherein the passenger turbulence data is automatically measured by sensors or manually entered by passengers into the communication devices operating in passenger mode.

11. The method of claim 10 comprising calibrating a passenger's future passenger turbulence data manually entered by the passenger according to a calibration metric defining the correlation between that particular passenger's past manually entered turbulence data and corresponding verified turbulence data.

12. The method of claim 1, wherein generating the turbulence map data comprises weighing the passenger turbulence data based on the corresponding passenger's security privileges.

13. The method of claim 1, wherein the turbulence map data is generated based solely on the passenger turbulence data, and not the flight crew turbulence data, only when the passengers have above threshold passenger security privileges.

14. The method of claim 1, wherein the turbulence map data is generated based solely on the passenger turbulence data, and not the flight crew turbulence data, only when an above threshold number of passengers indicate substantially the same turbulence level at substantially the same position and time.

15. The method of claim 1, wherein the turbulence map data is generated at least partially based on the passenger turbulence data and at least partially based on the flight crew turbulence data.

16. A device comprising:
one or more processors;
one or more memories; and
one or more instructions stored in the memory and executable by the processor, which, when executed, configure the one or more processors to:
receive flight crew turbulence data from a plurality of communication devices operated by flight crew members in flight crew mode during flights on-board respective airplanes of multiple airplanes, wherein the communication devices operating in flight crew mode have flight crew security privileges that self-authenticate the integrity of the flight crew turbulence data;
receive passenger turbulence data from a plurality of communication devices operated by passengers in passenger mode during flights on-board respective airplanes of multiple airplanes, wherein the communication devices operating in the passenger mode have passenger security privileges that do not self-authenticate, but require a centralized control device to authenticate, the integrity of the passenger turbulence data;
generate turbulence map data including accumulated tempo-spatial turbulence information by super-positioning onto a single tempo-spatial frame of reference the received flight crew turbulence data self-authenticated by the flight crew security privileges and the passenger turbulence data authenticated by the centralized control device; and distribute the turbulence map data to one or more of the pluralities of communication devices for displaying the distributed turbulence map data while operating in the flight crew mode or in the passenger mode.

17. The device of claim 16, wherein the one or more processors are configured to authenticate the passenger turbulence data at the centralized control device by comparing the passenger turbulence data with turbulence data that is automatically measured by sensors of a trusted self-authenticating device.

18. The device of claim 16, wherein the trusted self-authenticating device is selected from the a group consisting of: an airplane cockpit docked device, an airplane mounted device, an airplane embedded device, and one of the communication devices operating in flight crew mode.

19. The device of claim 16, wherein the one or more processors are configured to authenticate the passenger turbulence data at the centralized control device by determining that the passenger turbulence data reports a turbulence level that is less than or equal to a turbulence level reported by the flight crew turbulence data on-board the same airplane or a different airplane at substantially the same location and time.

20. The device of claim 16, wherein the one or more processors are configured to authenticate the passenger turbulence data at the centralized control device by authenticating the a passenger operating the communication device by determining that the passenger has above threshold passenger security privileges.

21. The device of claim 16, wherein the one or more processors are configured to increase the passenger security privileges for a passenger each time the passenger's communication device records passenger turbulence data that is verified against turbulence data recorded by a trusted self-authenticating device and to decrease the passenger security privileges for the passenger each time the passenger's communication device records passenger turbulence data that is contradicted by turbulence data recorded by the trusted self-authenticating device.

22. The device of claim 16, wherein the communication devices operating in flight crew mode self-authenticate the integrity of the flight crew turbulence data only when the communication devices are mounted into a flight crew docking station.

23. The device of claim 16, wherein the one or more processors are configured to generate the turbulence map data based on position and turbulence information from the flight crew turbulence data and only position information, from the passenger turbulence data without turbulence information.

24. The device of claim 16, wherein the flight crew turbulence data is automatically measured by sensors operably connected to the communication devices operating in flight crew mode.

25. The device of claim 16, wherein the passenger turbulence data is automatically measured by sensors or manually entered by passengers into the communication devices operating in passenger mode.

26. The device of claim 16, wherein the one or more processors are configured to calibrate a passenger's future passenger turbulence data manually entered by the passenger according to a calibration metric defining the correlation between that particular passenger's past manually entered turbulence data and corresponding verified turbulence data.

27. The device of claim 16, wherein the one or more processors are configured to generate the turbulence map data by weighing the passenger turbulence data based on the corresponding passenger's security privileges.

28. The device of claim 16, wherein the one or more processors are configured to generate the turbulence map data based solely on the passenger turbulence data, and not the flight crew turbulence data, only when the passengers have above threshold passenger security privileges.

29. The device of claim 16, wherein the one or more processors are configured to generate the turbulence map data based solely on the passenger turbulence data, and not the flight crew turbulence data, only when an above threshold number of passengers indicate substantially the same turbulence level at substantially the same position and time.

30. The device of claim 16, wherein the one or more processors are configured to generate the turbulence map data at least partially based on the passenger turbulence data and at least partially based on the flight crew turbulence data.

* * * * *